United States Patent [19]
Kelley

[11] Patent Number: 6,050,468
[45] Date of Patent: Apr. 18, 2000

[54] UNITARILY CONSTRUCTED APPARATUS FOR ADJUSTABLY SUPPORTING A BEVERAGE CONTAINER

[75] Inventor: Richard L. Kelley, Royal Oak, Mich.

[73] Assignee: Chrysler Corporation, Auburn Hills, Mich.

[21] Appl. No.: 09/148,590

[22] Filed: Sep. 4, 1998

[51] Int. Cl.[7] .............................. B60N 3/10; B60R 7/04
[52] U.S. Cl. ..................... 224/542; 224/552; 224/926; 248/311.2; 296/37.15
[58] Field of Search .................... 224/926, 542, 224/552, 556, 557; 248/311.2; 296/37.8, 37.15; D12/419, 420

[56] References Cited

U.S. PATENT DOCUMENTS

| | | | |
|---|---|---|---|
| 2,327,078 | 8/1943 | Teetor | 248/311.2 X |
| 4,655,425 | 4/1987 | Wallace et al. | 248/311.2 |
| 4,919,381 | 4/1990 | Buist | 224/926 X |
| 4,927,108 | 5/1990 | Blazic et al. | 248/311.2 |
| 4,981,277 | 1/1991 | Elwell | 248/311.2 |
| 5,024,411 | 6/1991 | Elwell | 248/311.2 |
| 5,060,899 | 10/1991 | Lorence et al. | 224/926 X |
| 5,289,962 | 3/1994 | Tull et al. | 224/273 |
| 5,494,249 | 2/1996 | Ozark et al. | 248/311.2 |
| 5,509,633 | 4/1996 | Ruster et al. | 224/926 X |
| 5,511,755 | 4/1996 | Spykerman | 224/926 X |
| 5,618,018 | 4/1997 | Baniak | 224/926 X |
| 5,639,052 | 6/1997 | Sauve | 248/311.2 |
| 5,655,742 | 8/1997 | Whitman et al. | 224/926 X |
| 5,745,565 | 4/1998 | Wakefield | 224/926 X |
| 5,782,448 | 7/1998 | Withun et al. | 224/926 X |
| 5,813,645 | 9/1998 | Droste et al. | 224/926 X |
| 5,839,711 | 11/1998 | Bieck et al. | 248/311.2 X |
| 5,860,630 | 1/1999 | Wildey et al. | 224/926 X |
| 5,921,519 | 7/1999 | Dexter et al. | 224/926 X |

*Primary Examiner*—Gregory M. Vidovich
*Attorney, Agent, or Firm*—James R. Yee

[57] ABSTRACT

A unitarily constructed apparatus for adjustably supporting a beverage container within a motor vehicle includes an upper flange, a lower base, and an outer wall interconnecting the upper flange and the lower base. The outer wall defines at least one recess for receiving a beverage container. Each recess has a maximum diameter. The outer wall is formed to include at least one resiliently deflectable portion associated with each recess. The resiliently deflectable portion extends inwardly from the maximum diameter. The apparatus is preferably unitarily constructed from a flexible material and removably insertable into an opening of a console of the motor vehicle.

17 Claims, 5 Drawing Sheets

UNITARILY CONSTRUCTED APPARATUS FOR ADJUSTABLY SUPPORTING A BEVERAGE CONTAINER

BACKGROUND OF THE INVENTION

1. Technical Field

The present invention relates to an apparatus for supporting a beverage container. More particularly, the present invention relates to a unitarily constructed apparatus which may be inserted into a recess provided in a console of a vehicle for adjustably supporting beverage containers of various sizes.

2. Discussion

Beverage containers are available in a wide range of sizes and are often transported in the passenger compartments of motor vehicles for the convenience of the occupants. By the nature of their generally upright and cylindrical constructions, beverage containers are not sufficiently stable to functionally withstand the jostling encountered during normal motor vehicle travel unless physically held or otherwise appropriately secured. Because it is often desirable to set aside a beverage container during the course of a trip, the containers are often placed on the floor or other surface where they are likely to be upset.

Currently, many automotive vehicle manufactures provide the passenger compartment of each vehicle with one or more devices for supporting a beverage container. The devices provide a place to secure a beverage container during vehicle operation. Typically, the devices are either stationary platforms mounted horizontally with respect to the vehicle in open view, or they are retractable or hidden from view and pulled out when needed. Previously, cup holders have been coupled with ashtrays, glove compartment doors, or simply formed as a cylindrical cavity in a vehicle console.

Cylindrical cavities formed in a vehicle console for supporting a beverage container are advantageous in that they are easily manufactured and relatively inexpensive. However, one problem with such an arrangement for supporting beverage containers is the inability to readily secure beverage containers of varying sizes. Known arrangements intended to adjustably accommodate beverage containers of various sizes include multiple parts resulting in increased expense and increased labor for installation. Thus, a need in the relevant art exists to provide an apparatus having a simple and inexpensive construction capable of adjusting to accommodate beverage containers of various dimensions.

SUMMARY OF THE INVENTION

It is therefore an object of the present invention to provide a unitarily constructed apparatus for adjustably supporting a beverage container which is capable of securing variously sized beverage containers.

It is a related object of the present invention to provide an apparatus having a simple construction and minimal parts which is capable of securing variously sized beverage containers.

In one form, the present invention provides a unitarily constructed apparatus for adjustably supporting a beverage container within a motor vehicle. The motor vehicle include a console defining an opening. The apparatus includes an upper flange, a lower base, and an outer wall. The outer wall interconnects the upper flange and the lower base. The outer wall defines at least one recess for receiving the beverage container. Each recess has a maximum diameter. The outer wall is formed to include at least one resiliently deflectable portion associated with each recess. The resiliently deflectable portion extends inwardly from the maximum diameter. In the preferred embodiment, the resiliently deflectable portions are three in number and are equally spaced about the maximum diameter. The apparatus is preferably constructed of a flexible material and removably insertable into the opening of the console.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
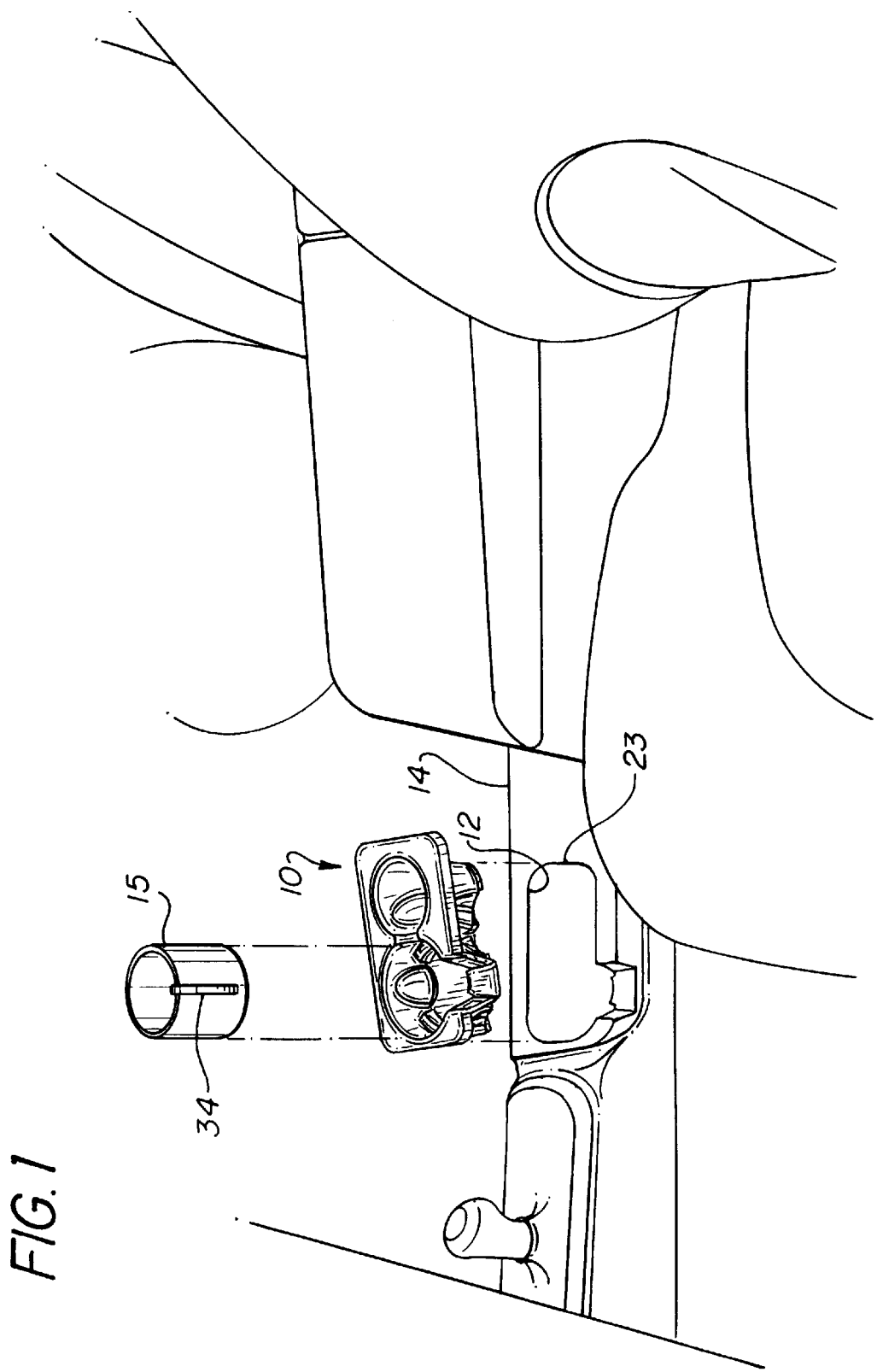
FIG. 1 is a perspective view illustrating an apparatus constructed in accordance with the teachings of a first preferred embodiment of the present invention shown operatively associated with a motor vehicle.

Referring first to FIG. 1, an apparatus 10 constructed in accordance with a first preferred embodiment of the present invention is illustrated operatively associated with a recess 12 provided in a console 14 of a motor vehicle. An exemplary beverage container illustrated as a coffee mug 15 is shown adapted to be securely received within the apparatus 10. It will be understood that the apparatus 10 is also intended to receive cups, cans, bottles and other beverage containers. As will become apparent below, apparatus 10 of the present invention functions to adapt the recesses 12 to accommodate beverage containers having varying dimensions. It will be understood by those skilled in the art that apparatus can be used with a variety of recesses and that the illustrated use is merely exemplary.

Figure 2:
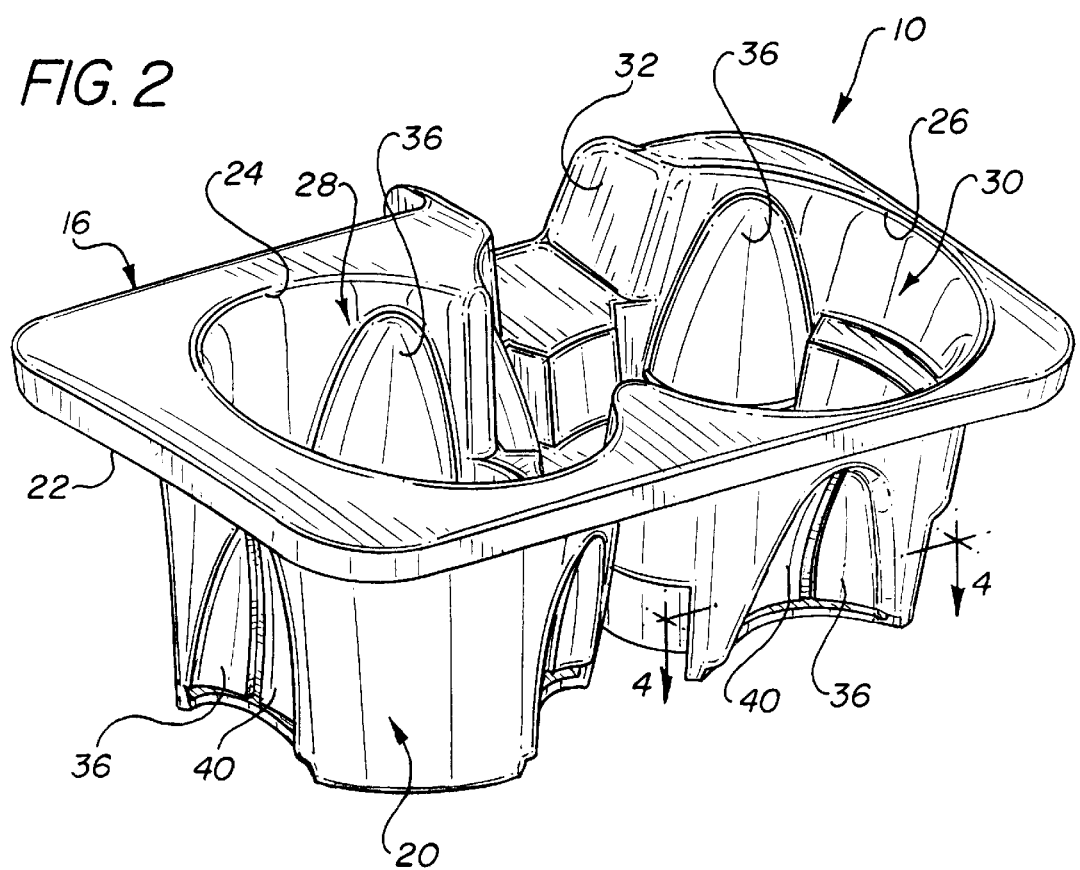
FIG. 2 is an enlarged perspective view of the apparatus of the first preferred embodiment of the present invention shown removed from the environment for purposes of illustration.
Figure 4:
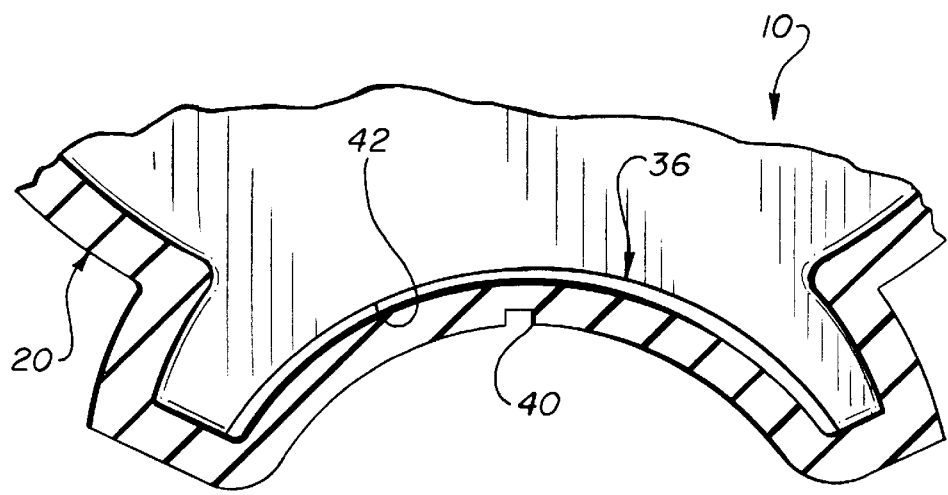
FIG. 4 is a sectional view taken along the line 4—4 of FIG. 2.
Figure 3:
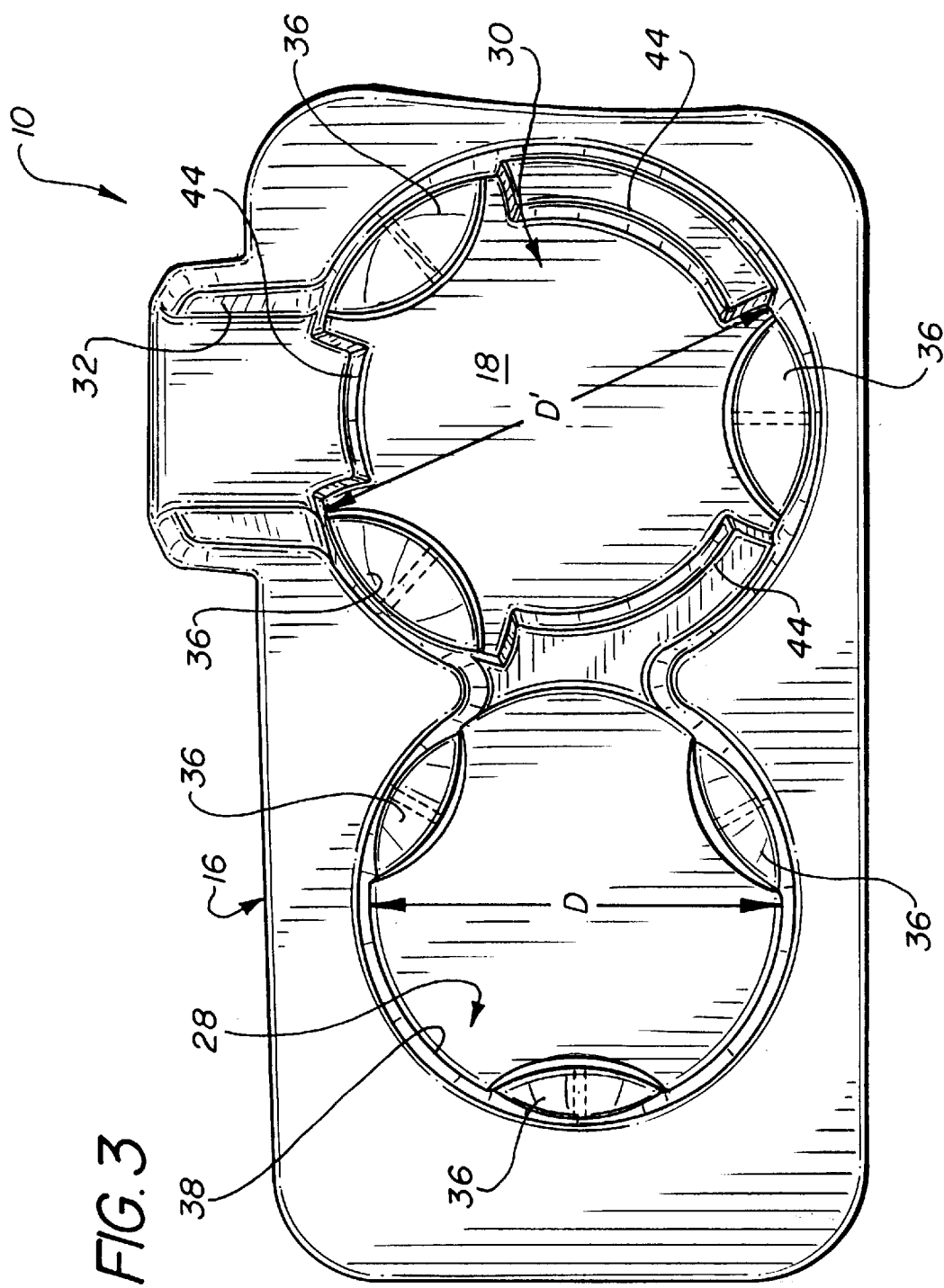
FIG. 3 is a top view of the apparatus of FIG. 2.
Figure 5:
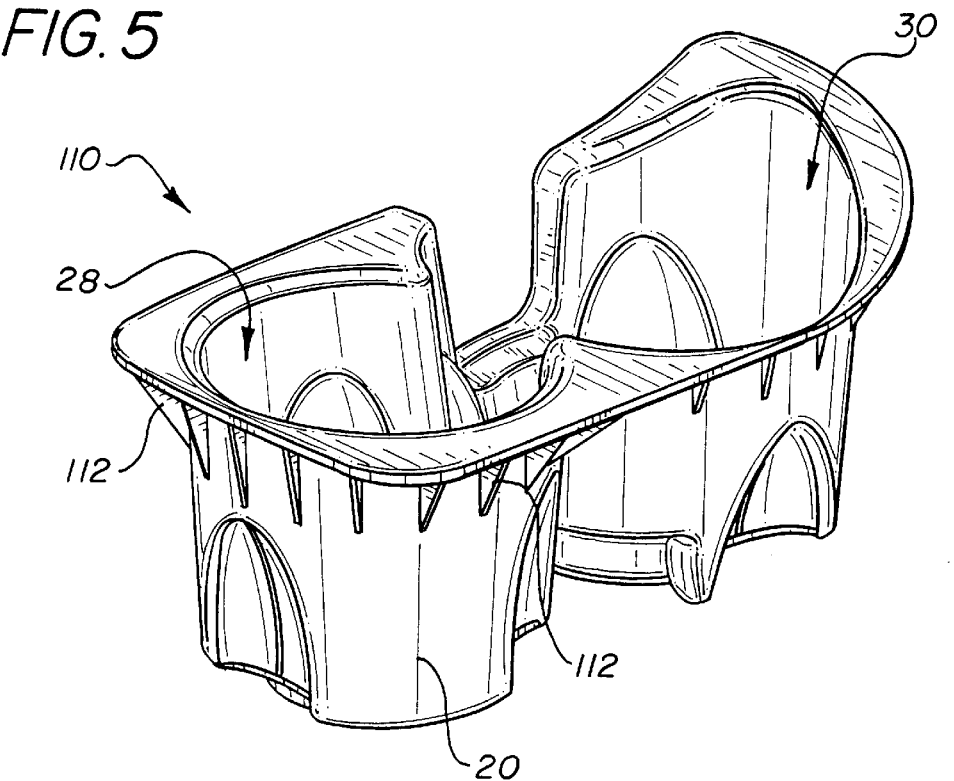
FIG. 5 is a perspective view of an apparatus constructed in accordance with the teachings of a second preferred embodiment of the present invention.
Figure 6:
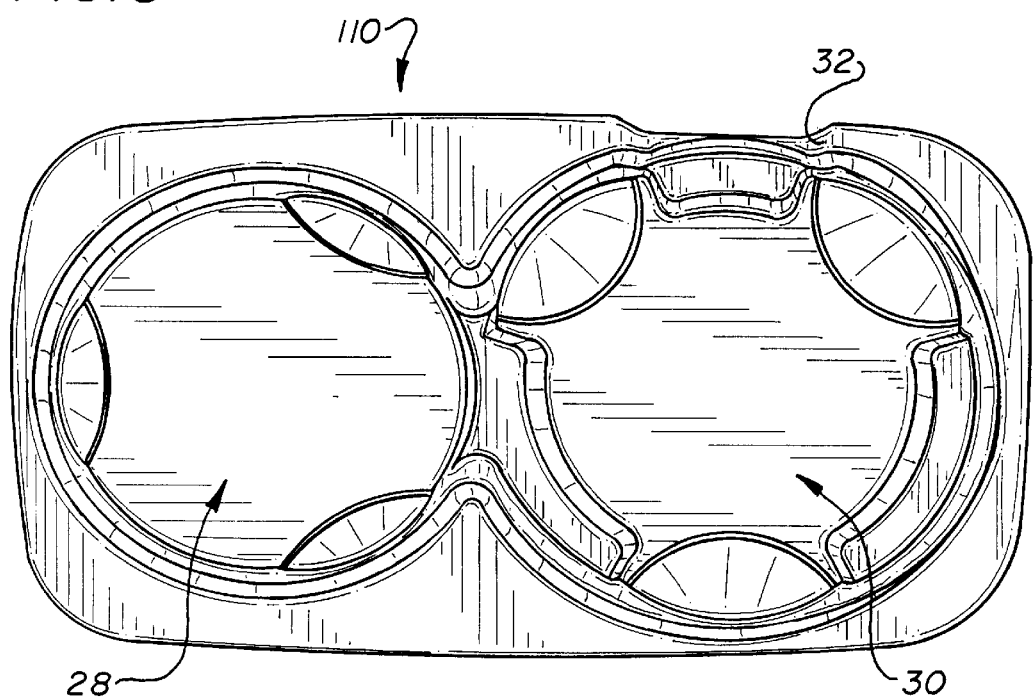
FIG. 6 is a top view of the apparatus of FIG. 5.
Figure 7:
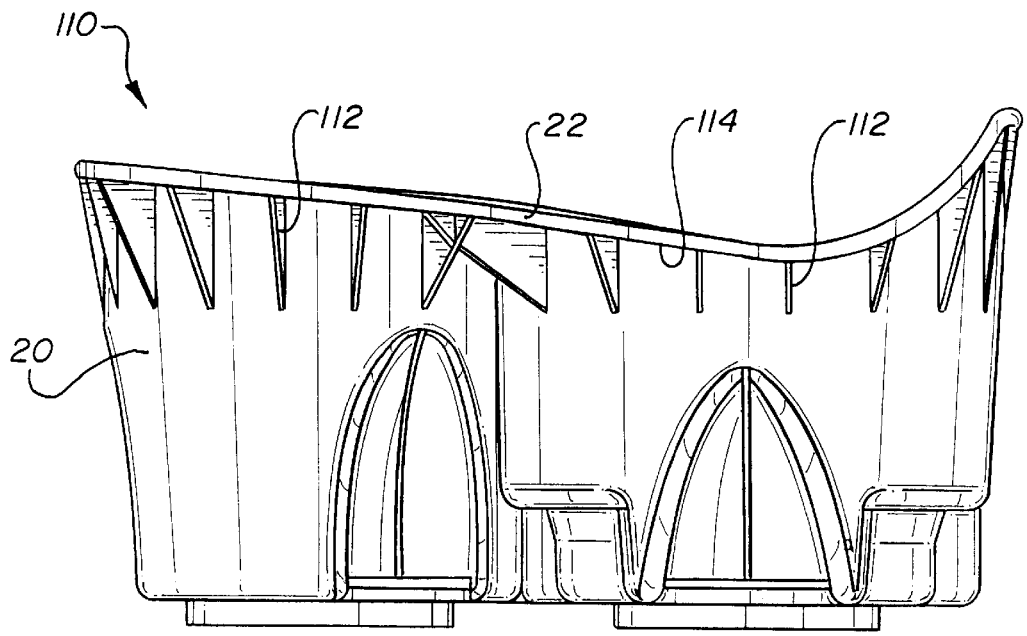
FIG. 7 is a side view of the apparatus of FIG. 5.
Figure 8:
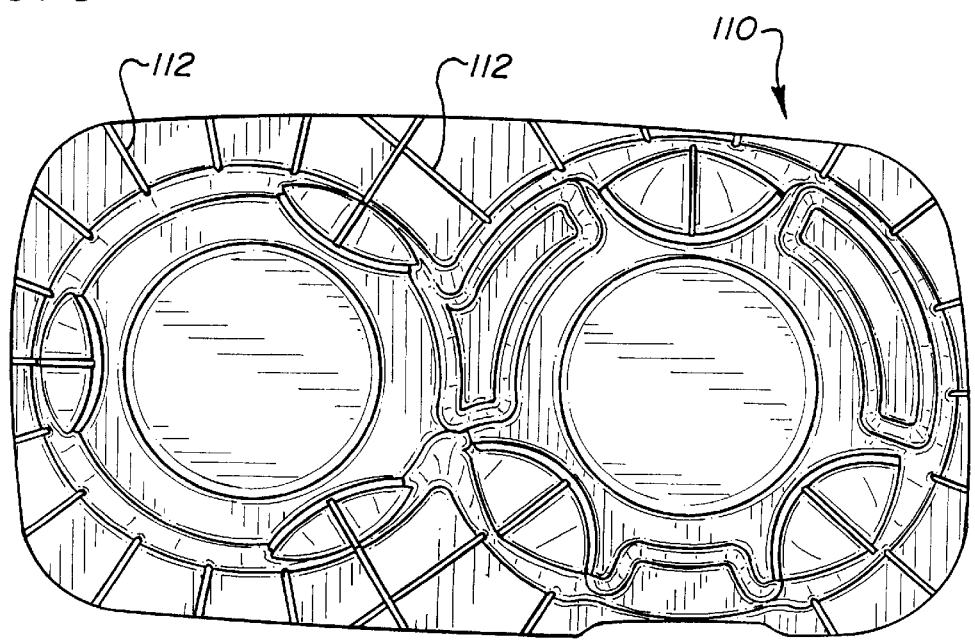
FIG. 8 is a bottom view of the apparatus of FIG. 5.

With continued reference to FIG. 1 and additional reference to FIGS. 2 through 4, the apparatus 10 of the first preferred embodiment of the present invention is shown to generally include an upper shelf or flange 16, a lower base 18 and an outer wall 20 which connects the upper flange 16 and the lower base 18. In the first preferred embodiment, the apparatus 10 is unitarily constructed from polyvinylchloride (PVC), thermoplastic rubber, or other suitably flexible material. It will be understood that the apparatus 10 is removably insertable into the opening 12 and thereby readily removed for cleaning. The preferred material of construction is dishwasher safe.

The upper flange 16 is generally rectangular in shape. As illustrated most clearly in the perspective view of FIG. 2, the upper flange 16 includes a downwardly extending lip 22 extending about its perimeter which cooperates with an edge 23 of the opening 12. The upper shelf 16 includes a pair of openings 24 and 26 which lead to recesses 28 and 30, respectively, defined by the side wall 20. The upper shelf 16 is partially interrupted by an opening 32 adapted to accommodate a handle 34 of a coffee cup or similar structure for a beverage container.

The first and second openings 28 and 30 of the apparatus 10 are both defined by the side wall 20 and the base 18. For purposes of this detailed description, it will be understood that the first and second recesses 28 are largely identical. For this reason, common reference numerals will be applied to identify features of the apparatus 10 defining the recesses 28 and 30 and the subject invention will be described primarily with reference to the first recess 28. The description insofar as it specifically relates to the second recess 30 will address differences therebetween.

The first recess 28 is defined by at least one resiliently deflectable portion 36 and a generally cylindrical wall 38. In the embodiment illustrated, the first recess 28 is defined by the generally cylindrical wall 38 and three resiliently deflectable portions 36. The resiliently deflectable portions 36 are equally spaced radially about the recess 28 at intervals of 120°. The generally cylindrical sidewall 38 defines an inner diameter D of the recess 28. In one application, the inner diameter D is approximately 3 inches.

Each of the resiliently deflectable portions 36 is shown to extend substantially along the entire vertical length of the recess 28. In the preferred embodiment, the resiliently deflectable portions 36 taper as they extend upwardly and are convexly curved in a horizontal plane. In one application, adjacent the base 18, the resiliently deflectable portions 36 radially extend into the inner diameter D approximately ⅜ of an inch. When a beverage container 15 is placed into the first recess 28, the resiliently deflectable portions 36 are resiliently displaced and thereby cooperate to stabilize the beverage container 15. Stabilization of the beverage container 15 is further facilitated by the material of the apparatus 10 as frictional engagement with the beverage container results.

To facilitate deflection of the resiliently deflectable portions 36, each of the resiliently deflectable portions 36 is provided with a vertically extending groove 40 in an outer surface thereof. The vertically extending groove 40, which is shown most clearly in the cross-sectional view of FIG. 4, extends substantially along the entire length of the resiliently deflectable portion 36 and defines a hinge line. This hinge line allows the apparatus 10 to self adjust to the diameter of the beverage container 15 inserted within the recess 28. To further facilitate deflection of the resiliently deflectable portions 36, a relief 42 is provided at the intersection of the resiliently deflectable portion 36 and the base 18. The relief 42 is shown to be an elongated opening therebetween.

With respect to the features of the apparatus 10 defining the second recess 30, the apparatus 10 is illustrated to include a plurality of stepped segments 44 which cooperate to define a second support surface for supporting a bottom of the beverage container 15. In the application described above, the second recess 30 has an inner diameter D' of approximately 3.5 inches. In this application, the stepped segments 44, which are interdisposed between adjacent ones of the resiliently deflectable portions 36, are particularly suited for supporting a conventionally sized coffee mug 15.

With reference now to FIGS. 5 through 8, an apparatus 110 constructed in accordance with the teachings of a second preferred embodiment of the present invention will now be described. As the apparatus 110 of the second preferred embodiment shares many structural features with the apparatus 10 of the first preferred embodiment, reference numerals introduced with respect to the first embodiment will be used to identify common elements. The apparatus 110 in the second preferred embodiment differs principally in that it incorporates a plurality of engagement members 112 for engaging the recess 12 of the console 14. As illustrated, the members 112 engage an upper portion of the side wall 20 and an undersurface 114 of the lip 22. In the second preferred embodiment, the members 112 are generally triangular in shape and are unitarily formed with the apparatus 110. The members 112 are intended to resiliently deflect and frictionally engage the opening 12 in the console 14. As with the first preferred embodiment, the apparatus 110 of the second preferred embodiment is unitarily constructed of PVC or a thermoplastic rubber.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An apparatus for supporting and receiving a beverage container the apparatus including a recess for receiving the beverage container, the recess defined by a side wall unitarily formed to include a generally cylindrical portion and at least one resiliently deflectable portion, said at least one resiliently deflectable portion inwardly extending from said generally cylindrical portion and including a vertically extending groove formed in a rear surface thereof.

2. The apparatus for supporting a beverage container of claim 1, wherein said at least one resiliently deflectable portion is convexly curved in a horizontal plane.

3. The apparatus for supporting a beverage container of claim 1, wherein said at least one resiliently deflectable portion upwardly tapers.

4. The apparatus for supporting a beverage container of claim 1, wherein said at least one resiliently deflectable portion includes three resiliently deflectable portions equally spaced about said recess.

5. The apparatus for supporting a beverage container of claim 1, wherein said apparatus is flexible.

6. The apparatus for supporting a beverage container of claim 1, wherein said apparatus is unitarily constructed.

7. An apparatus for supporting a beverage container within a motor vehicle, the apparatus comprising:
an upper flange;
a base; and
an outer wall interconnecting said upper flange and said base, said outer wall defining a recess for receiving the beverage container, said recess having a maximum diameter, said outer wall unitarily formed to include at least one resiliently deflectable portion inwardly extending from said maximum diameter and including a vertically extending groove formed in a rear surface thereof.

8. The apparatus for supporting a beverage container within a motor vehicle of claim 7, wherein said at least one resiliently deflectable portion is convexly curved in a horizontal plane.

9. The apparatus for supporting a beverage container within a motor vehicle of claim 7, wherein said at least one resiliently deflectable portion upwardly tapers.

10. The apparatus for supporting a beverage container within a motor vehicle of claim 7, wherein said at least one resiliently deflectable portion includes three resiliently deflectable portions equally spaced about said maximum diameter.

11. The apparatus for supporting a beverage container within a motor vehicle of claim 7, wherein said apparatus is unitarily constructed from polyvinylchloride or thermoplastic rubber.

12. The apparatus for supporting a beverage container within a motor vehicle of claim 7, further comprising a relief interbetween said resiliently deflectable portion and said base.

13. A unitarily constructed apparatus for adjustably supporting a beverage container within a motor vehicle, the motor vehicle having a console defining an opening, the apparatus comprising:

an upper flange;

a lower base; and an outer wall interconnecting said upper flange and said lower base, said outer wall defining at least one recess for receiving the beverage container, each recess having a maximum diameter, said outer wall formed to include at least one resiliently deflectable portion associated with each recess of said at least one recess and extending inwardly from said maximum diameter and wherein said at least one resiliently deflectable portion-includes a vertically extending groove formed in a rear surface thereof;

said apparatus being unitarily constructed from a flexible material and removably insertable into the opening of the console.

14. The apparatus for supporting a beverage container within a motor vehicle of claim 13, wherein said at least one recess includes a pair of recesses.

15. The apparatus for supporting a beverage container within a motor vehicle of claim 13, wherein said at least one resiliently deflectable portion is convexly curved in a horizontal plane.

16. The apparatus for supporting a beverage container within a motor vehicle of claim 13, wherein said at least one resiliently deflectable portion upwardly tapers.

17. The apparatus for supporting a beverage container within a motor vehicle of claim 13, wherein said at least one resiliently deflectable portion includes three resiliently deflectable portions equally spaced about said maximum diameter.

* * * * *